United States Patent
Lauria et al.

(10) Patent No.: US 7,108,883 B2
(45) Date of Patent: Sep. 19, 2006

(54) PROCEDURE TO OBTAIN A PRODUCT CONSISTING IN A PARTIALLY LOW-FAT FLOUR WITH A HIGH CONTENT OF STABILIZED, POLYUNSATURATED FATTY ACIDS, ESPECIALLY $\Omega_3$

(76) Inventors: Mariano Gustavo Lauria, O'Higgins 2613, 1° "B", 1428 —Buenos Aires (AR); Daniel Alfonso Nuñez, O'Higgins 2613, 1° "B", 1428 —Buenos Aires (AR)

( * ) Notice: Subject to any disclaimer, the term of this patent is extended or adjusted under 35 U.S.C. 154(b) by 181 days.

(21) Appl. No.: 10/727,352

(22) Filed: Dec. 2, 2003

(65) Prior Publication Data
US 2004/0137132 A1    Jul. 15, 2004

(30) Foreign Application Priority Data
Dec. 2, 2002    (AR)    .............................. P020104650

(51) Int. Cl.
*A23L 1/29*    (2006.01)
*A23L 1/015*   (2006.01)

(52) U.S. Cl. ...................... 426/516; 426/478; 426/481; 426/519; 426/489; 426/629; 426/648

(58) Field of Classification Search ................ 426/629, 426/648, 478, 481, 489, 516, 519
See application file for complete search history.

(56) References Cited

U.S. PATENT DOCUMENTS

2004/0185129 A1*    9/2004    Vuksan ........................ 424/776

FOREIGN PATENT DOCUMENTS

WO    99/62356    *    9/1999

* cited by examiner

*Primary Examiner*—Helen Pratt
(74) *Attorney, Agent, or Firm*—Thorpe North & Western

(57) ABSTRACT

A procedure which comprises a second step of pressing of the *Salvia Hispanica L.* seeds with temperature control modifying the ratio between the polyunsaturated fatty acids and antioxidants contained as well as obtaining an expeller.

The procedure comprises a third step in which the expeller obtained is let to cool until it reaches room temperature and a fourth step in which the expeller, at room temperature, is entered into a disc-driven mill to obtain different particle sizes of a partially low-fat flour with a high content of polyunsaturated fatty acids, especially $\Omega_3$ type.

25 Claims, No Drawings

PROCEDURE TO OBTAIN A PRODUCT CONSISTING IN A PARTIALLY LOW-FAT FLOUR WITH A HIGH CONTENT OF STABILIZED, POLYUNSATURATED FATTY ACIDS, ESPECIALLY $\Omega_3$ This application claims the benefit of the earlier filed patent application filed Argentina as application N° P-02-01-04650 filed on Dec. 2, 2002 in Argentina.

BACKGROUND OF THE INVENTION

1. Field of the Invention

The present invention consists of a procedure to obtain a product consisting in a flour which has a high content of stabilized, polyunsaturated fatty acids, especially $\Omega_3$, the product and sub-product obtained and the method for it to be incorporated as a dietary supplement.

With the purpose of making the present invention comprehensible in order that it should be put into practice easily, a precise description will be provided in the paragraphs hereunder regarding a preferred way of performing it.

The whole of it bearing a purely illustrative nature, not restrictive to the invention, however and the components of which may be selected among several equivalent ones without, on account of the former, moving away from the principles of the invention established in the present documentation.

2. Prior Art

A growing awareness about taking care of our health has led investigators to establish the importance which fatty acids, dietary fiber and natural antioxidants have upon a healthy diet.

Knowing that polyunsaturated or essential fatty acids cannot be synthesized by our body, efforts have been doubled in pursuit of incorporating them to our daily diet.

Aware that the incorporation of such acids in our bodies stands as a determining factor to reduce cholesterolemia and any risks of heart disease, which also play a major role in the development of the nervous and immunological systems and help towards a healthy development of pregnancy and child growth, it is due to this that several products containing them have been studied, and it has been established that one of the greatest populations of polyunsaturated fatty acids, specifically $\Omega_3$ fatty acids is found in flax seeds.

Nevertheless, efficient extraction processes call for the use of solvents, which, on the other hand, have not turned out to be efficient in totally detoxifying the fatty acids obtained from the seeds of such plants.

Furthermore, as a result of the investigations carried out, it has been established that flax seeds show other inconveniences which do not make their use advisable for human consumption, such as their content of cyanoglycosides and other components which antagonize with Vitamin B6.

To this respect, we know that low levels of vitamin B in our blood have a major connection with heart disease.

On the other hand, flax seeds lack all kinds of natural antioxidants, something which is translated into a quick decomposition of their fatty acids.

It is precisely the oxidation of fats which has become the greatest concern among consumers and businessmen alike, since this is what determines not only the appearance of off flavors and smells (mainly a rancid or a fish-like smell), but also, in addition, it favors aging processes as well as the development of degenerative diseases which are normally associated with aging, such as: brain dysfunction; deterioration of the immune system; cataracts; heart disease and cancer.

Other sources of polyunsaturated, fatty acids, especially $\Omega_3$ fatty acids which are currently being used, are those coming from sea products such as fish and algae; nonetheless, the use of such sources does present several setbacks.

Indeed, among their major inconveniences we should point out the one related to the predatory effect on natural stocks; the need of counting with special preservation and storage conditions, as well as their contamination levels, mainly due to heavy metals, something which is worrying and which has been steadily growing.

OBJECTIVE

Therefore the objective of the present invention is to count with a procedure to obtain a product consisting in a type of flour having a high content of polyunsaturated fatty acids, mainly $\Omega_3$ type, stabilized in a natural way, that is to say, without incorporating to them any additives.

It is also the objective of the present invention to count with a product consisting in a partially low-fat flour having a high content of fatty acids, mainly $\Omega_3$ type, which will incorporate natural antioxidants that will prevent such fatty acids from being degraded.

It is likewise the objective of the present invention to count with a partially low-fat flour with a high content of polyunsaturated fatty acids, especially $\Omega_3$ type which will not have any substances which may be harmful or contraindicated.

It is also the objective of the present invention to count with a partially low-fat flour with a high content of polyunsaturated fatty acids, especially $\Omega_3$ type, which may be sustainable and which will not affect natural stocks.

It is also the objective of the present invention to count with a partially low-fat flour with a high content of polyunsaturated fatty acids, especially $\Omega_3$ type, which will be stabilized in a natural way, that is to say, without incorporating to them any additives.

It is also the objective of the present invention to count with a partially low-fat flour with a high content of polyunsaturated fatty acids, especially $\Omega_3$ type, which will be apt to become a dietary supplement.

It is also the objective of the present invention to count with a partially low-fat flour with a high content of polyunsaturated fatty acids, especially $\Omega_3$ type, which will be apt for becoming a dietary supplement and that such product will be obtained on the basis of *Salvia Hispanica L.*

It is also the objective of the present invention to count with a sub-product consisting in a stable expeller of *Salvia Hispanica L.* seeds, with a high content of polyunsaturated fatty acids, especially $\Omega_3$ type, with the purpose of being used directly as a dietary supplement.

It is also the objective of the present invention to count with a sub-product consisting in a stable expeller of *Salvia Hispanica L.* seeds, with a high content of polyunsaturated fatty acids, especially $\Omega_3$ type, with the purpose of facilitating storage, handling and supply of newly-ground flour.

It is also the objective of the present invention to count with a method to incorporate a product consisting in a type of partially low-fat flour with a high content of polyunsaturated fatty acids, especially $\Omega_3$ type, as dietary supplement.

DESCRIPTION

Basically, the present invention consists in a procedure which presents the first step for the selection of *Salvia Hispanica L.* seeds and their placement in a press; a second step for the partial defattening of such seeds obtaining stable expeller as sub-product; a third step for the cooling of the stable expeller and a fourth step for the grinding of the stable expeller in order to obtain a product consisting in a type of partially low-fat flour with a high content of polyunsaturated fatty acids, especially $\Omega_{03}$ type, stabilized in a natural way.

The invention includes, likewise, a method which presents the first stage of adding of a product consisting in a type of partially low-fat flour with a high content of stable $\Omega_3$ and several other ingredients in a container where they are mixed and homogenized and a second stage for their fractioning, and in their case, cooking.

The method comprises an alternative for the adding of a sub-product consisting in a stable expeller and several other ingredients in a container where they are mixed until homogenized and a second stage for their fractioning, and in their case, cooking.

FUNCTIONING

Once the various stages as well as the components for the version of the invention have been established, and once they have been developed to explain their nature, right after this the description is supplemented with a description of the steps to be followed as well as the functional and operative relationship of its parts and of the result they provide.

Thus, with the purpose of obtaining a product consisting in a partially low-fat flour with a high content of fatty acids, especially stable $\Omega_{03}$ type, the starting point is the prior selection of a product that contains the fatty acids that are being sought.

Such selection is carried out by taking into account the several considerations performed previously in this specification, for which reason the inventors have established that such product must be *Salvia Hispanica L.*, a plant belonging to the family of Labiatae, whose high content of fatty acids is combined with a high quantity of natural antioxidants which stabilize them.

The inventors hereof have established that a type of flour obtained from the seeds of *Salvia Hispanica L.* allows the body to incorporate a great quantity of $\Omega_3$ without there being an intake of counter-effective ingredients as was the case with the flour made from flax seeds, and likewise, without the inconveniences which result from the utilization of products coming from the sea to which reference has already been made.

The inventors have established that the incorporation of flour obtained from the direct grinding of the seeds of *Salvia Hispanica L.*, has a period of time which has been estimated at a maximum of twenty days, during which such flour may still be used.

Once this time is over, and due to the quick degrading of all fatty acids included in the seed, we will be meeting the setbacks already mentioned with respect to flavor and clinical consequences.

Even though with the purpose of taking advantage of the great quantity of fatty acids included in the seed, it seems feasible to supplement the flour with chemicals in order to achieve the stabilization of such fatty acids, the preferred solution turns out to be that of looking for a procedure that will allow us to obtain a product in which, without there being any adding of chemicals, such fatty acids may remain stable during a prolonged period of time.

Based on the above, the inventors have stipulated that it is preferable to obtain a type of partially low-fat flour starting from a series of steps which include pressing the seeds of *Salvia Hispanica L.* in order to achieve a separation of a specific amount of the oil which the seed contains and thus obtain expeller as a sub-product.

Such expeller contains essential fatty acids of the omega type, and previously extracting a specific fraction of the oil included in the seed has the purpose of concentrating antioxidants and natural stabilizers and thus obtaining a stability which the flour obtained from the direct grinding of the seed does not have.

The inventors have established that both the low-fat flour as well as the expeller obtained with the procedure which is revealed are apt to become a supplement which can be incorporated to the diet of persons and animals alike with great benefits.

Should they be used in the diet of animals, the products derived from these, such as and by way of example, the eggs obtained from hens whose diet includes the flour or the expeller obtained with the procedure which is being revealed, incorporate benefits which are transmitted to the human being who consumes them.

The present invention consists then in a procedure which comprises a first step for the selection of the *Salvia Hispanica L.* seeds and their incorporation to pressing equipment.

In this first step, preferably, the pressing equipment will consist in an extruder with simple or similar screw.

The procedure which is described comprises a second step for the pressing of the *Salvia Hispanica L.* seeds in order to achieve the separation of a fraction of the oil which the seeds contain and to obtain a sub-product consisting in a stable expeller of *Salvia Hispanic L.* seeds containing polyunsaturated fatty acids, especially $\Omega_3$.type The procedure comprises, likewise, a third step in which the expeller obtained is left to cool until it reaches room temperature And a fourth step in which the expeller, at room temperature, is entered into a disc-driven mill in order to obtain different particles sizes of a partially low-fat flour with a high content of polyunsaturated fatty acids, especially $\Omega_3$.type.

During this second step, the working temperature is monitored constantly in order that it should never exceed 45° C.

The inventors have established that the pressing must be performed very carefully with the purpose of preserving and concentrating the natural antioxidants included in the seeds and thus preventing natural fatty acids from decomposing.

With such pressing, when extracting polyunsaturated fatty acids partially and concentrating the natural antioxidants which the seeds contain, the stabilization of the expeller is accomplished and the adding of artificial additives or supplements is avoided.

Likewise, a careful pressing procedure such as the one referred to allows to maintain a molecular cis-cis structure in all the polyunsaturated fatty acids, giving as a result a partially defattened expeller from which a type of flour is obtained which is healthier than flax flour since, even though just like in the case of the expeller obtained from flax they do possess a high concentration of polyunsaturated fatty acids, and mainly, of alpha-linolenic acid, also known as $\Omega_3$, the one obtained from the seeds of *Salvia Hispanica L.* lacks all of the toxic components that are found in the expeller obtained from the seeds of the former.

In fact, such toxic components restrict the use of flax whereas the polyunsaturated fatty acids obtained from the expeller of *Salvia Hispanica L.* have no restriction whatsoever, its intake being, on the contrary, recommended for people with heart problems and high cholesterol levels, as well as for those who need to develop their nervous and/or immune systems.

The inventors have established that the flour obtained from the direct grinding of the seed of *Salvia Hispanica L.* possesses a balance between polyunsaturated fatty acids and natural antioxidants which prevents the product from becoming stable and produces a quick degrading of such fatty acids.

The inventors have established also that the steps described above and which gradually lead to a partial defattening of the seed of *Salvia Hispanica L.*, modify the relationship among such polyunsaturated fatty acids which become reduced with respect to natural antioxidants in order to provide a partially defattened seed or expeller which is stable.

Therefore, both the product and the sub-product obtained with the procedure which has been described turn out to be stable and do not require that any artificial preserver be added in order to maintain the properties of the polyunsaturated fatty acids, especially $\Omega_3$.type.

The product, consisting in a partially low-fat flour with a high content of polyunsaturated fatty acids, especially $\Omega_3$ type which is stable as a consequence of grinding the expeller of the seeds of *Salvia Hispanica L.* performed pursuant to the procedure which is revealed, provides between three and twenty-nine percent of fat, being preferred as a range the one comprised between eighteen and twenty-five percent of fatty matter.

More specifically, the range of fat of such partially low-fat flour with a high content of polyunsaturated fatty acids, especially $\Omega_{o3}$ type obtained as a result of grinding the expeller of the seeds of *Salvia Hispanica L.* resulting from applying the procedure which is revealed, presents a range of fatty matter between twenty-one and twenty-three percent.

The partially low-fat flour with a high content of polyunsaturated fatty acids, especially $\Omega_3$ type obtained as a result of grinding the seeds of the expeller of the seeds of *Salvia Hispanica L.*, resulting from applying the procedure which is revealed also includes between a sixteen and a twenty-seven percent of protein and, preferably, between an eighteen and a twenty-five percent, and still more preferably, between a twenty-one and a twenty-three percent.

The product which is revealed also contains between a twenty and a thirty-four percent of dietary fiber, preferably between a twenty-three and a twenty-nine percent, and still more preferably between a twenty-five and a twenty-seven percent, of which at least a forty percent is made up of insoluble dietary fiber.

The fatty acids contained in the product which is made public are mainly oleic acid up to a seven percent; linoleic acid up to a twenty-three percent, alpha-linolenic acid up to sixty-three percent; palmitic acid up to seven percent; stearic acid up to three percent and myristic acid up to a tenth part percent.

Among the amino-acids of the proteins included in the product which is revealed, stand out, mainly, threonine, lysine and leucine.

In turn, a mixture of oils is revealed which comprises at least the following i-caryophyllene; i-bourbonene; i-pinene; widdrol; germacrene; linalool; valencene; muurolene; globulol; a-humulene and t-cadinol contained in the product obtained from the procedure described.

The partially low-fat flour with a high content of polyunsaturated fatty acids, especially $\Omega_3$ type obtained as a result of grinding the expeller of the seeds of *Salvia Hispanica L.* resulting from applying the procedure which is revealed comprises, likewise, several vitamins among which can be mentioned vitamin A; niacin, riboflavin and thiamin.

Likewise, the product comprises macro-elements among which are found calcium, potassium, magnesium and phosphorus and it also contains aluminum, boron, copper manganese, molybdenum and zinc, among microelements.

As it has already been said, the partially defattened flour with a high content of polyunsaturated fatty acids, especially $\Omega_3$ type, obtained as a result of grinding the expeller of the seeds of *Salvia Hispanica L.* resulting from applying the procedure which is revealed, comprises likewise several antioxidants and natural stabilizers which allow to control the oxidation of fats without being necessary to use any chemicals as supplements.

Thus, among the non hydrolyzed antioxidants, the flour which is revealed hereby includes, at least, chlorogenic acid; and among hydrolyzed antioxidants, it includes at least miricetin, quercetin and kaempferol.

Likewise, the flour which is revealed includes cafeic acid.

As we have seen, on the basis of the grinding of the expeller, a product is obtained which consists of a partially low-fat flour with a high content of stabilized polyunsaturated fatty acids, especially $\Omega_3$ type, which mixed with several ingredients, allows to incorporate substantial amount of such polyunsaturated fatty acids which are essential for a healthy diet.

It has been established that the partially low-fat flour with a high content of stabilized polyunsaturated fatty acids, especially $\Omega_3$ type obtained as a result of the processing of the expeller obtained from applying the procedure described, includes natural antioxidants, dietary fiber, stabilizers, fatty matter, amino-acids, vitamins, essential oils, proteins, macro and micro elements and that they are all essential for our diet.

From the nutritional analysis performed we can infer that one hundred grams of the product obtained with the procedure which is revealed provide energy equivalent to five hundred kilocalories and that they contain twenty grams of proteins, twenty two grams of dietary fiber, a supply of lipids of at least seventeen grams and a half, and ten grams of carbohydrates.

Due to the characteristics and properties described, four grams of the partially low-fat flour obtained with the procedure that has been described are-enough to provide, at one hundred percent, the minimum intake of polyunsaturated fatty acids, especially $\Omega_3$ type which are recommended for a healthy diet.

This is the reason why the present invention includes a method to incorporate the product as a dietary supplement consisting in a partially low-fat flour with a high content of stabilized, polyunsaturated fatty acids, especially $\Omega_3$.type.

Such method includes a first stage of adding of up to ninety eight percent in weight of such partially low-fat flour with a high content of stabilized $\Omega_3$ with at least a type of flour selection from among wheat, corn, or soy flour or a mixture of cereal flour, or a type of flour or a mixture of legume flour and additives in general in a mixer and mixed until homogenization.

Likewise, the method comprises a second stage of fractioning of the homogenized mixture, and in its case, of cooking.

As an alternative execution, the first stage includes the adding of up to a ninety eight percent in weight of a partially low-fat flour with a high content of stabilized $\Omega_3$ obtained through the procedure described, with meat-based paste, seasoning and additives in general in a mixer and mixed until homogenized.

Alternatively, such first stage includes the adding of up to ninety eight percent in weight of a type of partially low-fat flour with a high content of stabilized $\Omega_3$, obtained through the procedure described with a dairy product in a mixer and mixed up until homogenized.

Alternatively, such first stage includes the adding of up to ninety eight percent in weight of a type of partially low-fat flour with a high content of stabilized $\Omega_3$, obtained through the procedure described with a vegetable-made paste, seasoning and additives in general in a mixer and mixed until homogenized.

Preferably, the method described includes obtaining a dietary supplement which includes between one to four percent in weight of a type of partially low-fat flour with a high content of stabilized $\Omega_3$, obtained by grinding the expeller of Salva Hispanica L. using the procedure described.

In the present specification reference has been made to a procedure to obtain a product consisting in a partially low-fat flour bearing the characteristics pointed out and, likewise, it has been considered as a dietary supplement, publicizing a method which includes its utilization.

The inventors do understand that such type of partially low-fat flour can be partially or totally replaced by the sub-product resulting from the procedure described, that is to say, the expeller, which as a consequence of such partial defattening through the procedure described meets the same characteristics already described for the flour and in the same percentages and, therefore, has a stability which allows it to be stored for a long period of time prior to being consumed.

As a consequence of the difference in particle size existing between the product and the sub-product, and only due to such reason, it becomes necessary to increase the quantity, in volume, of the sub-product used in order to achieve an intake which will respect the minimum levels recommended for polyunsaturated fatty acids.

The inventors have established that both the product as well as the sub-product obtained through the procedure revealed, once arranged in bags, in a fresh and dry place, maintain the properties, elements and percentages mentioned above, including the stability of fatty acids, during a period of time ranging from eight to sixteen months, a period which can be prolonged substantially through a storage specifically oriented to such preservation.

Such period allows the expeller to be stored for a period of time which exceeds the one needed for a new harvest and, consequently, to carry out the grinding and fractioning as the supply of the flour may call for, thereby permitting users to receive it well-ground, and the producer will find it easier to store and handle it.

In the present specification, the term "additives in general" is used to comprise the adding carried out on a regular basis in the technique status, such as those used to provide flavor, to agglutinate, to odorize, to color, to supplement, to preserve, etcetera.

Thus we have reviewed one of the possibilities that lead us to materialize the invention and the way in which the latter works being the documentation supplemented with a summary of the invention included in the claiming clauses which are added hereinafter.

The invention claimed is:

1. A process for producing a partially low-fat flour having a high content of stabilized polyunsaturated fatty acid, comprising the steps of:
    selecting a plurality of Salvia Hispanica L. seeds;
    incorporating the plurality of Salvia Hispanica L. seeds into pressing equipment;
    pressing under temperature control the plurality of Salvia Hispanica L. seeds with the pressing equipment where i) a ratio between polyunsaturated fatty acids and antioxidants of the Salvia Hispanica L. seeds is changed, and ii) an oil and an expeller sub-product is formed therefrom;
    cooling the expeller sub-product to room temperature; and
    grinding the expeller sub-product, already at room temperature, to obtain a different particle size to form a partially low-fat flour with a high content of polyunsaturated fatty acids.

2. The process of claim 1, wherein the stabilized polyunsaturated fatty acid is an $\Omega_3$ polyunsaturated fatty acid.

3. The process of claim 1, wherein the oil is a mixture of oils selected from a group consisting of i-caryophyllene, i-bourbonene, i-pinene, widdrol, germacrene, linalool, valencene, muurolene, globulol, a-humulene, t-cadinol and mixtures thereof.

4. The process of claim 1, wherein the polyunsaturated fatty acids further comprises multiple vitamins and macro-elements.

5. The process of claim 4, wherein at least one of the multiple vitamins is selected from a group consisting of vitamin A, niacin, riboflavin and thiamin.

6. The process of claim 4, wherein the macro-elements are selected from a group consisting of calcium, potassium, magnesium, phosphorus, aluminum, boron, copper manganese, molybdenum and zinc.

7. The process of claim 1, wherein the polyunsaturated fatty acids comprise up to 7 wt % of oleic acid, up to 23 wt % of linoleic acid, up to 63 wt % of alpha-linolenic acid, up to 7 wt % of palmitic acid, up to 3 wt % of stearic acid, and less than a tenth part percent of myristic acid.

8. The process of claim 1, wherein the pressing equipment is a screw extruder which gradually presses the seeds such that the molecular cis-cis structure of the polyunsaturated fatty acids are preserved.

9. The process of claim 1, wherein the step of pressing step concentrates and preserves the antioxidants.

10. The process of claim 1, wherein the step of grinding is accomplished by a disc-driven mill.

11. The process of claim 1, wherein the step of pressing includes a working temperature that is maintained below −45° C.

12. The process of claim 1, wherein the changed ratio between polyunsaturated fatty acids and antioxidants is modified by reducing the weight percentage of polyunsaturated fatty acids.

13. A expeller sub-product made from pressed Salvia Hispanica L. seeds, obtained from the process of claim 1, comprising polyunsaturated fatty acids and antioxidants.

14. The expeller sub-product of claim 13, wherein the expeller sub-product further comprises up to 29 wt % of fatty matter, up to 27 wt % of protein, and up to 34 wt % of dietary fiber, of which at least 40 wt % is insoluble dietary fiber.

15. The expeller sub-product of claim 13, wherein the polyunsaturated fatty acids include up to 7 wt % of oleic acid, up to 23 wt % of linoleic acid, up to 63 wt % of alpha-linolenic acid, up to 7 wt % of palmitic acid, up to 3 wt % of stearic acid, and less than a thenth of a part of myristic acid.

16. The expeller sub-product of claim 13, wherein the polyunsaturated fatty acids further comprises multiple vitamins and macro-elements.

17. The process of claim 16, wherein at least one of the multiple vitamins is selected from a group consisting of vitamin A, niacin, riboflavin and thiamin.

18. The process of claim 16, wherein the macro-elements are selected from a group consisting of calcium, potassium, magnesium, phosphorus, aluminum, boron, copper manganese, molybdenum and zinc.

19. A method for incorporating the expeller sub-product of claim 13, comprising:
mixing in a mixer until homogenized the expeller sub-product with at least one product select from a group consisting of wheat flour, corn flour, soy flour, cereal flour, legume flour, meat based paste, vegetable based paste, dairy products and mixtures thereof; and
cooking the homogenized mixture.

20. The method of claim 19, wherein the expeller sub-product represents up to at least 90 wt % of the homogenized mixture.

21. A partially low-fat flour having a high content of stabilized polyunsaturated fatty acid produced by the process of claim 1, wherein the partially low-fat flour comprises 3–29 wt % fats, 16–27 wt % protein, and 20–34 wt % dietary fiber, of which at least 40 wt % is insoluble dietary fiber.

22. The partially low-fat flour of claim 21, wherein the protein includes at least one amino acid selected from the group consisting of threonine, lysine and leucine.

23. A partially low-fat flour of claim 21, wherein the low-fat flour provides 19–21 wt % of fat, 21–23 wt % of protein and 25–27 wt % of dietary fiber, of which at least 40 wt % is insoluble dietary fiber.

24. A method for incorporating the partially low-fat flour product of claim 21 into various food products, comprising:
mixing in a mixer until homogenized the partially low-fat flour with at least one food product selected from a group consisting of wheat flour, corn flour, soy flour, cereal flour, legume flour, meat based paste, vegetable based paste, dairy products and mixtures thereof; and
cooking the homogenized mixture.

25. The method of claim 24 wherein the partially low-fat flour having a high content of stabilized polyunsaturated fatty acids represents 1–4 wt % of the homogenized mixture.

* * * * *